(12) United States Patent
Benz et al.

(10) Patent No.: US 6,879,861 B2
(45) Date of Patent: Apr. 12, 2005

(54) POLYMERIC MATERIALS WITH IMPROVED DIELECTRIC BREAKDOWN STRENGTH

(75) Inventors: Michael E. Benz, Ramsey, MN (US); Mark A. Tapsak, San Diego, CA (US); Angela Pratt, St. Paul, MN (US); Randall V. Sparer, Andover, MN (US)

(73) Assignee: Medtronic, Inc., Minneapolis, MN (US)

( * ) Notice: Subject to any disclaimer, the term of this patent is extended or adjusted under 35 U.S.C. 154(b) by 295 days.

(21) Appl. No.: 09/745,619

(22) Filed: Dec. 21, 2000

(65) Prior Publication Data

US 2002/0082673 A1 Jun. 27, 2002

(51) Int. Cl.$^7$ .................................................. A61N 1/00
(52) U.S. Cl. ......................... 607/116; 607/115; 607/1; 607/122; 607/36; 607/119; 174/110 PM; 524/583; 524/585
(58) Field of Search ............................... 607/116, 115, 607/1, 122, 123, 124, 125, 126, 127, 128, 9, 36, 5, 4, 2, 119, 129, 142, 152, 120, 121; 524/471, 477, 583, 585, 485; 428/379, 383, 461, 457; 174/107, 110 PM, 120 SR, 106 D; 361/273; 604/151

(56) References Cited

U.S. PATENT DOCUMENTS

| 3,445,394 A | 5/1969 | Hunt |
| 3,482,033 A | 12/1969 | Kenney et al. |
| 3,542,684 A | 11/1970 | Hunt et al. |

(Continued)

FOREIGN PATENT DOCUMENTS

| EP | 035-271 A1 | 9/1981 |
| JP | 56-092946 A | 7/1981 |
| JP | 56-109404 A | 8/1981 |

OTHER PUBLICATIONS

ASTM D149–97a "Standard Test Method for Dielectric Breakdown Voltage and Dielectric Strength of Solid Electrical Insulating Materials at Commercial Power Frequencies", 14–26.

Brochure for *Electric Power Research Institute* prepared by *General Electric Company*, "A new Class of Additives to Inhibit Tree Growth in Solid Extruded Cable Insulation," EL–530, Research Project 7851–1, Final Report (Jul. 1979).

Peruzzotti, F. et al., "Test procedures for the evaluation of defect tolerance of electrically stressed polymers, " *IEEE Annual Report Conference on Electrical Insulation and Dielectric Phenomena*, San Francisco, CA, (Oct. 20–23, 1996) 48–51.

Wartusch, J., "Increased Voltage Endurance of Polyolefine Insulating Materials by Means of Voltage Stabilizers," Conf. Rec. IEEE Int. Symp. Electr. Insul. (1980) 216–221.

Roseen, P. et al., "External PD resistance of thermoplastic and XLPE containing voltage stabilizers," *IEEE Transactions on Dielectrics and Electrical Insulation*, 5:189–194 (1998).

"High–Voltage Engineering: Theory and Practice", ed. M. Khalife, Cairo University, Giza, Egypt, Chapter 7:174–187, Chapter 8:204–216 (1990).

(Continued)

*Primary Examiner*—Fadi H. Dahbour
(74) *Attorney, Agent, or Firm*—David P. Ruschke; Kenneth J. Collier

(57) ABSTRACT

A novel polymeric electrically insulating material that includes a linked voltage stabilizing agent. Also provided are methods of making the novel material and articles and devices that incorporate the novel material, particularly implantable medical devices.

23 Claims, 1 Drawing Sheet

U.S. PATENT DOCUMENTS

| | | | | |
|---|---|---|---|---|
| 3,671,513 A | * | 6/1972 | Hunt | 524/471 |
| 3,915,945 A | * | 10/1975 | Takahashi et al. | 524/485 |
| 3,933,772 A | * | 1/1976 | Takahashi et al. | 524/477 |
| 3,984,338 A | | 10/1976 | Vincent | |
| 3,985,938 A | | 10/1976 | Takahashi et al. | |
| 4,161,952 A | | 7/1979 | Kinney | |
| 4,206,260 A | | 6/1980 | McMahon | |
| 4,216,101 A | | 8/1980 | Davis | |
| 4,299,713 A | | 11/1981 | Maringer et al. | |
| 4,458,105 A | * | 7/1984 | Roenisch et al. | 174/106 D |
| 4,492,647 A | | 1/1985 | Braus | |
| 4,520,230 A | * | 5/1985 | Uesugi et al. | 174/107 |
| 4,821,723 A | | 4/1989 | Baker, Jr. et al. | |
| 4,840,983 A | | 6/1989 | Vincent | |
| 4,876,147 A | * | 10/1989 | Schlag et al. | 428/379 |
| 4,945,449 A | * | 7/1990 | Cansell et al. | 361/273 |
| 4,975,329 A | * | 12/1990 | Bothe et al. | 428/461 |
| 5,131,388 A | | 7/1992 | Pless et al. | |
| 5,144,949 A | | 9/1992 | Olson | |
| 5,158,078 A | | 10/1992 | Bennett et al. | |
| 5,199,428 A | | 4/1993 | Obel et al. | |
| 5,207,218 A | | 5/1993 | Carpentier et al. | |
| 5,312,453 A | | 5/1994 | Shelton et al. | |
| 5,314,430 A | | 5/1994 | Bardy | |
| 5,330,507 A | | 7/1994 | Schwartz | |
| 5,331,966 A | | 7/1994 | Bennett et al. | |
| 5,354,316 A | | 10/1994 | Keimel et al. | |
| 5,545,186 A | | 8/1996 | Olson et al. | |
| 5,660,728 A | | 8/1997 | Saaski et al. | |
| 5,665,473 A | * | 9/1997 | Okoshi et al. | 428/457 |
| 5,702,618 A | | 12/1997 | Saaski et al. | |
| 5,705,070 A | | 1/1998 | Saaski et al. | |
| 6,234,772 B1 | * | 5/2001 | Wampler et al. | 604/151 |
| 6,501,992 B1 | * | 12/2002 | Belden et al. | 607/122 |

OTHER PUBLICATIONS

Penuzzotti, F. et al, IEEE Annual Report Conference on Electrical Insulation and Dielectric Phenomena, San Francisco, CA. (Oct. 20–23, 1996) pp 48–51.

Roseen, P., et al, IEEE Transactions on Dielectrics and Electrical Insulation, 5:189–194 (1998).

Wartusch, J, Conf. Rec IEEE International Symposium Electr. Insul. (1980) 216–221.

* cited by examiner

POLYMERIC MATERIALS WITH IMPROVED DIELECTRIC BREAKDOWN STRENGTH

BACKGROUND OF THE INVENTION

Polymeric compositions are well-known and are used extensively as insulation materials in medical devices, as well as in wire and cable. Solid polymeric insulating materials are characterized by various physical and electrical properties which include resistance to mechanical cut-through, stress crack resistance, and resistance to dielectric failure.

Unfortunately, polymeric materials used as insulators in medium and high voltage environments often suffer from degradation process commonly known as "treeing," which can ultimately lead to dielectric breakdown of the polymeric insulating material. Treeing is an electrical pre-breakdown process. As the polymeric composition breaks down, the damage progresses through the insulator, or dielectric, in a path that looks something like a tree. Treeing usually is a slow type failure and may take years to cause a failure in the insulation.

Trees that form in the presence of water, and in particular at low voltages, are called water trees. Electrochemical trees are similar to the water trees but are characterized by the presence of metal ions in the trees. When water is absent, the trees which form are called electrical trees. Treeing can occur and/or progress as a result of partial discharges, as a result of electrical impulses, AC or DC voltages, or in the presence of moisture. U.S. Pat. No. 4,206,260 contains a discussion of the electrical treeing problem in polymer compositions and cites numerous patents attempting to overcome this problem.

It is commonly believed that trees start at an imperfection in the polymeric material. This imperfection can be a small void or a small solid contaminant. Although efforts have been made to improve the manufacturing processes so as to reduce the incidence of imperfections, total success in eliminating structural faults has not been achieved (P. Roseen et al., *IEEE Transactions on Dielectrics and Electrical Insulation*, 5:189–194 (1998)). Likewise, if the voids in the polymeric material are filled, there is slight improvement in resistance to treeing, but it remains a problem. As an example, U.S. Pat. No. 4,206,260 relates to insulation manufactured for high voltage power cable that contains an alcohol that imparts resistance to electrical tree growth to the composition.

Another avenue that has been explored to slow or halt progression toward dielectric breakdown in insulating polymeric materials involves the use of mobile voltage stabilizing additives (VSAs). A VSA typically contains an electron acceptor group and an electron donor group, positioned such that there is a potential for hydrogen bonding and reversible proton transfer between the two groups (see U.S. Pat. No. 3,445,394). VSAs are thought to trap and deactivate electrons, thus inhibiting treeing. Mobile VSAs are typically blended into the polymeric insulating material, and generally must be mobile and sufficiently compatible (soluble) with the material such they can migrate to the voids and solid impurities which are the points of treeing initiation. By filling and surrounding these faults in the insulating material mobile VSAs can retard the initiation of the trees; and by filling the tree channel as it is formed mobile VSAs can retard the growth of the trees. If a VSA is too mobile, however, it can migrate to the surface and evaporate or leach out of the insulating material. Leaching of the VSA into the surrounding environment results in less protection against dielectric breakdown and, in the case of implantable medical devices, for example, can release toxic agents into the body.

VSAs have also been added to silicone oils, thereby increasing their dielectric strength. Silicone oils find use as dielectric fluids in transformers and capacitors. In both of the described VSA uses, the additive is a small molecule capable of diffusion through the insulation matrix.

Many organic additives have been discovered which are quite effective in retarding the growth of both types of trees. Most of the voltage stabilizers are mobile aromatic compounds. Acetophenone is perhaps one of the best known anti-treeing agents; others include fluoranthene, pyrene, naphthalene, o-terphenyl, vinylnaphthalene, anthracene, alkylfluoranthenes and alkylpyrenes. A list of aromatic voltage stabilizing additives can be found in U.S. Pat. No. 3,445,394. Silanes and organosilanes can also function as VSAs (U.S. Pat. Nos. 3,984,338; 4,840,983; 4,492,647). In addition, water tree resistant compositions are disclosed in Japanese Patent Number Sho 56 [1981]-92946 (crosslinkable polyolefin resin composed of a silicone-grafted polyolefin, a di-t-butyl phenol derivative that acts as a water tree inhibitor, a free radical initiator and a silanol condensation catalyst), and Japanese Patent Number Sho 56 [1981]-109404 (power cable insulating composition composed of a polyethylene-polypropylene copolymer or a polyethylene-polypropylene-polydiene terpolymer, an organic peroxide, and a diorgano polysiloxane).

As medical devices evolve, they typically become smaller in size. Decreases in size for leads and other articles that make use of polymeric materials for electrical insulation are limited, however, because the potential for dielectric breakdown increases as the dielectric layer gets smaller or thinner. Inclusion of mobile VSAs in the polymeric material of these devices is problematic because the VSAs are more likely to diffuse or leach out of the thinner dielectric layers. A method for preventing dielectric breakdown of an insulating polymer that does not suffer from the disadvantages of mobile voltage stabilizing agents would therefore be a welcome advance in the field of polymeric electrical insulation in general, and to the field of electrically insulated medical devices in particular.

SUMMARY OF THE INVENTION

The invention provides an electrically insulating material that includes a polymeric component having at least one linked voltage stabilizing agent (VSA). The linkage can be covalent or ionic. In a preferred embodiment, the voltage stabilizing agent is a covalently linked voltage stabilizing agent.

A covalently linked voltage stabilizing agent is one that is covalently linked to or within (i.e., forms an integral part of) a polymeric component of the electrically insulating material of the invention. Thus, a covalently linked voltage stabilizing agent can be covalently incorporated into the backbone of the polymeric component and/or can be covalently attached pendant to the backbone of the polymeric component at an internal position, at one or both ends of the polymeric component, or at any combination of locations.

A voltage stabilizing agent that carries a full or partial charge can be ionically linked to a polymeric component of an electrically insulating material by ionically binding it to an appropriately charged residue at any location on the polymeric component.

A method for making a novel electrically insulating material is also provided. In one embodiment of the method of the invention, a first monomer containing at least one voltage stabilizing agent and, optionally, a second monomer are polymerized to yield a polymeric electrically insulating material. In another embodiment of the method of the invention, at least one voltage stabilizing agent is covalently pendant to a polymeric backbone to yield a polymeric electrically insulating material.

The invention also provides a polymer blend that includes at least one first polymer containing at least one linked voltage stabilizing agent and at least one second polymer. The linkage can be covalent or ionic. Preferably, the first polymer contains at least one covalently linked voltage stabilizing agent. The first and second polymers may or may not be crosslinked, either within themselves or with each other. The polymer blend optionally comprises an interpenetrating polymer network. Also provided by the invention is electrically insulating material containing the polymer blend, as well as a method for making the polymer blend by blending the first and second polymers, as by physical admixing, melt blending, solvent casting, or dissolution.

The invention further provides polymer components that are highly loaded with VSAs, as well as electrically insulating materials that contain such highly loaded polymer components. These highly loaded polymer components are preferably characterized by a VSA:polymer ratio (by weight) of at least about 50:50; more preferably, the VSA:polymer ratio is at least about 70:30. These highly loaded polymer components are well-suited for use as the first polymer in a polymer blend of the invention.

The invention further provides an article or device containing a novel polymeric electrically insulating material having at least one linked VSA according to the invention. The linkage can be covalent or ionic. Preferably, the article or device contains an electrically insulating material having at least one covalently linked VSA. The electrically insulating material may be an integral part of the article, or it may surface-attached, as in a surface layer or coating. The article or device can take the form of a transformer, a capacitor, a high voltage cable, or an electrical lead, for example. Thus, the article or device of the invention is useful in any setting requiring an electrically insulating polymer, whether commercial, industrial, medical, etc. Preferred embodiments of the device include a capacitor that includes a solid dielectric layer, a high voltage cable, an adhesive, and an electrically insulating fluid such transformer fluid or capacitor electrolyte fluid.

The invention includes an implantable medical device that contains an electrically insulating material containing at least one linked voltage stabilizing agent. The linkage can be covalent or ionic. The implantable medical device can be a cardiac pacing lead, a tachycardia lead, a neurological lead, an implantable pulse generator (IPG), a pacemaker-cardioverter-defibrillator (PCD), a neurostimulator, and nerve stimulator, a muscle stimulator, an implantable monitoring device, an implantable fluid handling device, a defibrillator, an implantable cardioverter/defibrillator (ICD), an implantable gastric stimulator, an implantable drug pump, an implantable hemodynamic monitoring device, or any other implantable medical device, without limitation, that contains an electrically insulating polymer. The VSA included in the medical device of the invention is preferably, but need not be, covalently linked.

DETAILED DESCRIPTION OF THE PREFERRED EMBODIMENTS

Figure 1:
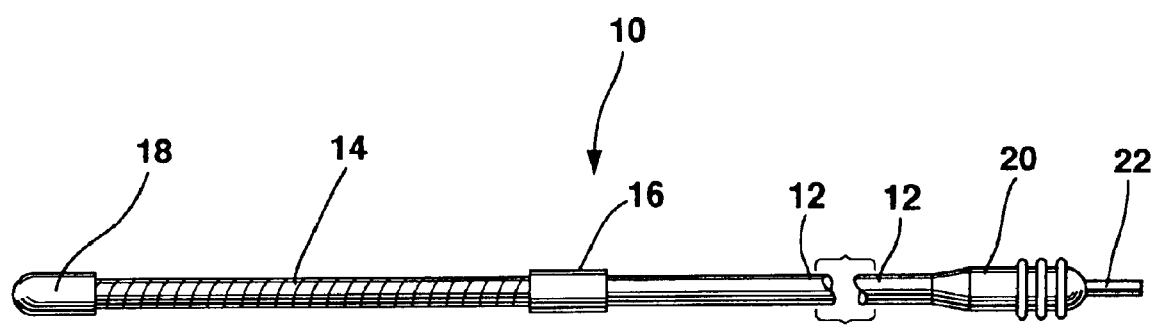
FIG. 1 is a plan view of a ventricular endocardial lead having a generally straight configuration.

The present invention provides an electrically insulating material that includes a polymeric component containing at least one linked voltage stabilizing agent (VSA), or a combination thereof. Thus, the electrically insulating material optionally contains two or more different voltage stabilizing agents. Unless otherwise specified, the articles "a" and "an" are to be interpreted as meaning "at least one" and therefore include the singular as well as the plural.

The term "electrically insulating" is necessarily a relative one; that is, whether a material is "electrically insulating" depends upon its environment of use and the nature of the material it insulates. In general, a material is "electrically insulating" if, when placed between the material to be insulated and another material, it prevents electricity from being conducted from the insulated material to the other material. In most applications, the conductivity of an electrically insulating material is greater than 1 ohm-cm; more preferably, it is greater than $1 \times 10^8$ ohm-cm; most preferably it is greater than $1 \times 10^8$ ohm-cm.

The linkage of the VSA to or within the polymeric component can be a covalent or an ionic linkage. Preferably, it is a covalent linkage. A "covalently linked voltage stabilizing agent" or "covalently linked voltage stabilizing additive" means a voltage stabilizing agent that is, or is part of, a constituent monomer forming the polymer backbone (i.e., that is covalently incorporated into the polymer backbone), or that is covalently attached to the polymer backbone as a pendant moiety, as further described below. An "ionically linked voltage stabilizing agent" or "ionically linked voltage stabilizing additive" means a voltage stabilizing agent that is ionically bonded to a charged residue at any location on the polymeric component. An ionically linked voltage stabilizing agent has a full or partial ionic charge, either positive or negative, and it ionically binds to a position on the polymer backbone carries an opposite full or partial charge. For example, the voltage stabilizing agent can contain a quaternary amine, and the polymer component can contain a negatively charged residue, or vice versa.

Covalent linkage of the VSA increases the dielectric breakdown strength of polymeric material by allowing high loading levels of the VSA. Because VSAs are typically poorly soluble in polymeric materials, blending the VSAs into polymeric materials in accordance with prior art methods limits the amount of VSA that can be incorporated into the insulating material. Covalent linkage of the VSA to the polymer in accordance with the present invention allows molar amounts of the VSA to be incorporated into a polymeric material using covalent linkage as compared to blending.

Covalent linkage of the VSA also prevents diffusion or leaching of the VSA from the polymeric material, which is particularly important when the electrically insulating material is in contact with fluids. If desired, linkers can be utilized to increase the mobility of the VSA functional groups within the insulating material while still keeping the VSA covalently linked to the polymer. High VSA loading levels and prevention of VSA diffusion are especially desirable for insulating materials used in medical applications, as the use of these improved materials can avert biocompatiblity problems. To the best of the Applicants' knowledge, prior art implantable medical devices such as medical leads have not incorporated VSAs. The improved electrically insulating material of the invention is also useful in cables and related materials used in the telecommunications industry, as it prevents evaporation of the VSA.

Electrically Insulating Material

The electrically insulating material of the invention can be a solid or a liquid. An electrically insulating liquid can have any desired viscosity. The electrically insulating material contains one or more polymeric components, and each polymeric component contains one or more VSAs. The electrically insulating material optionally further includes fillers such as talc and silica. Minor amounts of other additives may also be employed in conventional amounts to obtain the desired results. Conventional antioxidants such as the hindered phenols, polyquinolines and the like may be employed. Other ingredients that may be included are plasticizers, dyes, pigments, heat and light stabilizers, antistatic agents, glass or carbon fibers, processing aids such as waxes, and the like.

Polymeric Component

Polymers preferably include thermoplastics and thermosets (such as silicone rubber) and can be crosslinked or noncrosslinked. Unless otherwise specified, the word "polymer" as used herein includes a copolymer. A "copolymer" is a polymer formed by the copolymerization of two or more polymers. Thermoplastics include, for example, polyurethanes, polyolefins, polyacetals, polycarbonates, vinyls, polyamides, polyimides, acrylics, polystyrenes, polysulfones, polyetherketones, cellulosics, polyesters, polyethers, fluoropolymers, and copolymers thereof such as olefin-vinyl copolymers, olefin-allyl copolymers and copolymers of polyethers and polyamides. Especially preferred as thermoplastic components of the electrically insulating material of the invention are polyurethanes, polyamides, polyimides, and thermoplastic copolymers of a polyamide such as polyether-bis-amides. Preferred polyolefins are polymers of olefins, more preferably alpha-olefins, which contain from about two to about six carbon atoms, e.g., crosslinked and noncrosslinked polyethylene, polypropylene, polybutene, polyisobutylene, poly(4-methyl pentene), as well as poly(ethylene-copropylene) rubber. Copolymers of ethylene, and other compounds interpolymerizable with ethylene such as butene-1, pentene-1, propylene, styrene, and the like, may be employed. In general, the copolymer will be comprised of 50 percent by weight or more of ethylene. Examples of olefin-vinyl copolymers include copolymers of ethylene-vinyl acetate, ethylene-vinyl propionate, ethylene-vinyl isobutyrate, ethylene-vinyl alcohol, ethylenemethyl acrylate, ethylene-ethyl acrylate, ethylene-ethyl methacrylate, and the like. In general, the ethylene constitutes at least 25 percent by weight of the copolymer. Examples of olefin-allyl copolymers include copolymers of the ethylene-allyl benzene, ethylene-allyl ether, and ethylene-acrolein. It is preferred, however, that the polymer be a polyolefin, with polyethylene being most preferred. Examples of vinyl polymers include polyvinyl chloride, polyvinyl acetate, vinyl chloride/vinyl acetate copolymers, polyvinyl alcohol and polyvinyl acetal. When it is desired to use a polymeric component which can be crosslinked, crosslinking can be accomplished by any of the known procedures such as chemical means including peroxide cross-linking; by radiation using electron accelerators, gamma-rays, high energy radiation, such as X-rays, microwaves etc.; or by thermal crosslinking. The basic procedures for crosslinking polymers are extremely well known to the art and need not be described here in detail.

The polymeric component of the electric insulating material can be a solid, a physically crosslinked semisolid (i.e., a gel), a non-crosslinked semisolid (i.e., a gum), or a fluid. Fluidic (or liquid) electrically insulating materials typically contain polymers in the form of oils such as silicone oils.

Voltage Stabilizing Agents

Preferred VSAs have one or more of chemical properties set forth in U.S. Pat. No. 3,445,394. A preferred VSA includes at least one electron acceptor group and at least one electron donor group containing a proton ($H^+$) that is reversibly transferable between the acceptor and donor groups. The electron acceptor group is preferably a strongly unsaturated group, such as nitro, carbonyl, nitrile, thiol (as well as Se—H and Te—H) phenyl and polycyclic aromatics. The electron donor group is preferably is preferably an amino and lower alkyl group, such as —$NH_2$, —$CH_2$— and —$CH_3$. Preferably the acceptor and donor groups are positioned relative to each other on the VSA such that there is potential hydrogen bonding and/or proton transfer between them, as when they are ortho with respect to one another on a benzene ring or are separated by a double bond. Reversibility of proton transfer between the acceptor and donor groups is exemplified, although not limited to, keto-enol isomerization. The presence of a double bond or conjugated system is important both sterically (for optimal positioning of the donor and acceptor groups) and for its electronic character and partipation in the proton transfer event. The chemical nature of the acceptor and donor groups and of the chemical bond(s) that connect them preferably favor transfer of charge and energy, and the dissipation of bond energy as thermal energy. The plana or near plana structure of a conjugated system of alternating single and double bonds is an example of an advantageous structural arrangement. The conjugated system is preferably sufficiently large and complex to provide for electron capture and subsequent energy dissipation without producing irreversible bond rupture.

A general structure of a VSA that can be covalently linked to an insulating polymeric material is represented as:

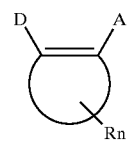

I where D and A are donor and acceptor groups respectively, n is an integer zero or greater and R can be a number of different substituents on the aromatic ring which may or may not take part in the voltage stabilizing ability of the compound. The ring structure may be aromatic, heteroaromatic, polycyclic aromatic or polycyclic heteroaromatic. The simplest example is where the VSA is a substituted benzene ring:

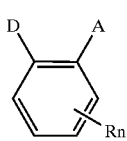

II

D and A can also exist within another ring system, as shown in a polycyclic VSA where the carbonyl serves as the acceptor group A and where $R^2$ could be $CH_2$, O, S, a single bond, or absent.

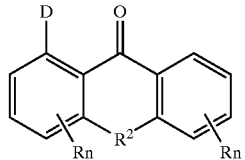

III

In addition, the VSA can have multiple D and A groups as shown below:

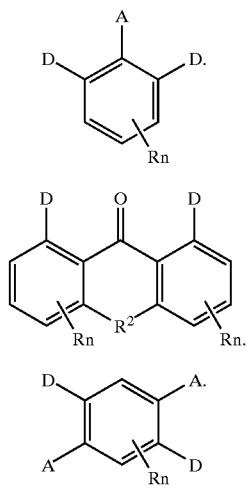

IV

V

VI

Examples of VSAs include various aromatic compounds such as acetophenone, fluoranthene, pyrene, alkylfluoranthenes and alkylpyrenes, as well as silanes, organosilanes and disiloxanes.

Notwithstanding the above, it should be understood that the novelty of the invention does not reside in the structure of a particular VSA, but rather in the covalently bonding of the VSA to a polymeric component of an insulating material.

Covalent Incorporation of a VSA into a Polymer

In one embodiment of the polymeric material of the invention, VSAs are covalently incorporated into the polymer as part of the polymer backbone. Typically the VSA is incorporated into the backbone by copolymerizing a VSA monomer with a second monomer. Within the polymer backbone, the VSA can be randomly distributed (to yield a copolymer) or regularly distributed (to yield a block copolymer). Alternatively, the VSA is itself the polymer, and the polymeric material is prepared by polymerizing the VSA monomer or by copolymerizing it with a second VSA monomer. It is conceivable that the acceptor group of the VSA is present in a first monomer and the donor group of the VSA is present in a second monomer, and that a functional VSA is made by copolymerizing the first and second VSA monomers.

In another embodiment of the polymeric material of the invention, VSAs are attached pendant to the polymer. The VSA can be attached using optional spacers of selected lengths and either randomly distributed along the polymer backbone or regularly distributed along the polymer backbone. Preferably the pendant linkage between the VSA and the polymer chain is long enough to provide the flexibility necessary for the VSA to act efficiently in high electric fields (AC or DC). When spacers are used the VSA is no longer sterically hindered and can orient itself in an electric field. A pendant VSA attached with a spacer functions somewhat as if it is not covalently constrained but instead is diffusing within the polymer. The spacer used in making the pendant linkage preferably contains at least one carbon atom. Space lengths of about two to about four carbon atoms are preferred. Other atoms, such as silicon, oxygen, and the like, can be used as part of the space function. VSAs can also covalently incorporated into the polymer at a polymer terminus (i.e., at an end terminus or a branch terminus). The attachment point of the VSA to the polymer can be made through one or more of the D, Z, or the various R groups on the VSA as shown in I.

Optimally, the polymeric component of the electrically insulating material contains the least amount of VSA needed to prevent dielectric breakdown of the insulating material under its conditions of use, so that any potentially adverse effects its inclusion may have on other properties of the electrically insulated material (such as its strength or flexibility) are minimized. The amount of VSA incorporated into an electrically insulating material according to the invention varies according to its intended use, and depends, for example, on the nature of the polymeric component and the environment or application in which it is to be employed. To be effective in preventing dielectric breakdown, the VSA content in the polymeric component of the electrically insulating material is in most applications at least about 0.1%, by weight; more preferably at least about 1%, by weight, and most preferably at least about 5% covalently bound VSA, by weight. A highly loaded polymeric component that is useful, for example, in polymer blends can contain up to about 100% VSA, by weight, as in embodiments wherein VSA monomers are polymerized to form the polymeric backbone.

In determining the weight percent of the VSA in the polymeric component of the electrically insulating material, the weight of the VSA monomer is divided by the combined weights of the VSA monomer and other monomer(s) used to form the polymer.

The optimal load level of the VSA may depend on the application, and the invention should be understood as including all VSA load levels, without limitation. For example, in applications where the mechanical properties of the electrically insulating material are adversely affected by the incorporation of the VSA(s), it is desirable to minimize the amount of the VSA in the material while still including enough to achieve the benefits of improved dielectric breakdown strength. In other applications that demand higher VSA load levels, the present invention makes those higher load levels possible.

The invention provides methods of making an electrically insulating material containing a polymeric component having at least one covalently linked VSA. There are many synthetic schemes that can be used to effect covalent linkage of a VSA to an insulating polymer. The most common synthetic methods include ring-opening reactions and condensation reactions. The method described in Example I, which employs a condensation reaction to pendantly link a VSA to a silicone polymer, was chosen for its simplicity in evaluating the technology. Example II shows synthesis of a VSA-containing random copolymer (containing polydimethyldisiloxane) using a ring opening reaction. Suitable VSAs can be either incorporated in a polymer such as silicone rubber during cure, or they can be pre-attached pendent to a silicone fluid as an ingredient in the uncured rubber. Curing of the latter would covalently incorporate the VSA into the rubber. In this manner, a higher loading of VSA can be achieved compared to blending a VSA into the rubber. In other words, the amount of VSA that can be incorporated into the copolymer would not be limited due to the solubility of the VSA in the silicone material. This is generally a limiting factor in previous descriptions of VSA use. The order of mixing the components and the specific procedure employed is not critical for the purpose of this invention.

Articles and Devices

Articles and devices containing an electrically insulating material that includes a polymeric component containing at least one covalently or ionically linked voltage stabilizing agent are included in the invention, without limitation as to type of article or device or its field of use. Such devices are especially useful in the medical arts. For example, the amount of voltage that can be applied to a capacitor in an ICD without degrading the dielectric layer limits how small the capacitors can be that are used in that device. By incorporating into the dielectric layer a covalently bound VSA that improves dielectric strength, capacitors are expected to be able to operate more reliably at higher voltages than are currently in use. The electrically insulating material of the invention can be used at any location in an ICD where electrical insulation is required and which can accommodate the use of a polymeric material.

Advantageously, increased dielectric breakdown strength allows for a decrease in device size without compromising the electrically insulative properties of the device. The present invention allows, for example, ultrathin polymer membranes to be used as insulating layers in medical applications. It is expected that these ultrathin membranes will prove useful in the construction of implantable cardioverter/defibrillators and implantable pulse generators. Covalently or ionically linked VSAs can also be incorporated into medical (and electrical) lead insulation, preferably into silicone and polyurethane insulating materials. The technology allows for thinner lead bodies and less distance between lumens of a lead body. Use of the polymeric electrically insulating material of the invention in an implantable neurostimulation device is also envisioned.

FIG. 1 is a plan view of a ventricular endocardial lead 10 having a generally straight configuration and is exemplary of one embodiment of the present invention. The lead is provided with an elongated insulative lead body 12 having a distal end 18. The insulative lead body is fabricated from an electrically insulating material that includes a polymeric component containing a covalently linked voltage stabilizing agent. A coiled electrode 14 is present in the vicinity of the distal end of lead 10. Coiled electrode 14 may be fabricated using close wound conductive coils, mounted exterior to elongated insulative sheath 12, or may be fabricated according to the teachings of U.S. Pat. No. 4,161,952 issued to Kinney. The rounded distal tip 18 may be conductive or insulative. When it is insulative, distal tip 18 can also be fabricated from an electrically insulating material that includes a polymeric component containing a covalently linked voltage stabilizing agent. Lead 10 bears a connector 20 at its proximal end having a pin 22 coupled to electrode 14 by means of a conductor within insulative lead body 12.

The present invention accordingly includes both implantable and external medical devices such as cardiac pacing leads, tachycardia leads, neurological leads, and various devices that incorporate leads as provided by the invention, including an implantable pulse generator (IPG) such as a pacemaker, a pacemaker-cardioverter-defibrillator (PCD), an implantable neurostimulator or nerve stimulator, a muscle stimulator, an implantable monitoring device, an implantable fluid handling device, a defibrillator, an implantable cardioverter/defibrillator (ICD), a gastric stimulator, a drug pump, and a hemodynamic monitoring device. For example, the implantable device can be a pacemaker such as that described in U.S. Pat. No. 5,158,078 to Bennett, et al.; U.S. Pat. No. 5,312,453 to Shelton et al.; or U.S. Pat. No. 5,144,949 to Olson et al., or a pacemaker-cardioverter-defibrillator corresponding to any of the various commercially-available implantable PCDs such as those described in U.S. Pat. No. 5,545,186 to Olson, et al.; U.S. Patent No. 5,354,316 to Keimel; U.S. Pat. No. 5,314,430 to Bardy; U.S. Pat. No. 5,131,388 to Pless; or U.S. Pat. No. 4,821,723 to Baker, et al. Alternatively, an implantable device according to the present invention can be an implantable neurostimulator, nerve stimulator or muscle stimulator such as that disclosed in U.S. Pat. No. 5,199,428 to Obel, et al.; U.S. Pat. No. 5,207,218 to Carpentier, et al.; or U.S. Pat. No. 5,330,507 to Schwartz, or an implantable monitoring device such as that disclosed in U.S. Pat. No. 5,331,966 to Bennett, et al.

Additionally, the implantable device may be micromachined devices such as implantable fluid handling devices for continuous administration of therapeutic agents including those for pain management, cancer chemotherapy, treatment of intractable spasticity, to name a few. Such devices are described in, for example, U.S. Pat. Nos. 5,705,070; 5,702,618; and 5,660,728 all to Saaski et al.

Therefore, the present invention is believed to find wide application in any form of implantable device that makes use of electrically insulating polymers. As such, the description herein making reference to any particular medical device is not to be taken as a limitation of the type of medical device envisioned by the present invention.

Solid dielectric layers for capacitors used in other fields, such as the semiconductor and telecommunications industries can also be improved by covalently linking VSAs to the constituent polymeric material. High voltage cable insulation is also expected to benefit from the inclusion of covalently or ionically linked VSAs. In general, the invention contemplates the use of polymeric electrically insulating materials that include covalently or ionically linked VSAs in any application where dielectric breakdown is a concern.

Dielectric Fluids

Higher loadings of VSAs in dielectric fluids such as those containing silicone or ethylene glycol are also made possible by the invention. Transformer fluids, capacitor electrolyte fluids, and other liquid energy storage media containing covalently or ionically linked VSAs are examples of dielectric fluids whose performance can be improved by the present invention.

Adhesives and Coatings

VSAs can be covalently or ionically linked to the polymeric components of silicone adhesives, epoxies, and dielectric coatings. An article can contain, as an integral part of its structure, a polymeric electrically insulating material having covalently-incorporated VSAs (i.e., bulk incorporation of the electrically insulating material); alternatively, an article can be coated with a polymeric electrically insulating coating containing covalently-incorporated VSAs (i.e., surface treatment with an electrically insulating material).

Polymer Blends

The invention further includes polymer blends made by blending a polymer containing at least one covalently or ionically linked VSA with one or more other polymers. Blending can be achieved using any conventional method, such as physical admixture, melt blending, solvent casting, or dissolution. In this aspect of the invention, the polymer containing the covalently or ionically linked VSA can be viewed as an "additive" that could be used with any other electrically insulating polymer to make a voltage stabilized blend. Preferably the polymeric VSA "additive" contains a relatively high load of VSA, for example at least about 50% VSA by weight, more preferably at least about 70% by weight, such that when the polymeric VSA "additive" is mixed with the other polymer(s) the resulting blend contains proportionately less VSA, by weight, for example less than about 50% VSA by weight. The polymer blend can be, but need not be, crosslinked after admixing. Advantageously, blending a polymeric VSA "additive" with a second polymer allows the second polymer to be made available in a form that contains a nonleaching VSA, thereby significantly extending the commercial applicability of the second polymer as an electrically insulating material.

The present invention is illustrated by the following examples. It is to be understood that the particular examples, materials, amounts, and procedures are to be interpreted broadly in accordance with the scope and spirit of the invention as set forth herein.

EXAMPLES

Example I

Pendant Covalent Attachment of a Voltage Stabilizing Agent to a Silicone Polymer End Group Scheme 1

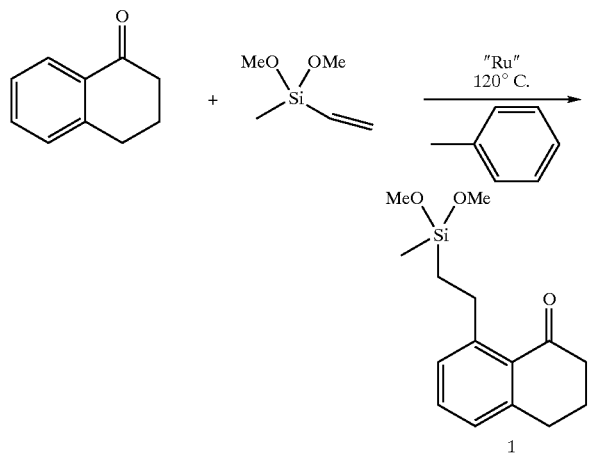

where "Ru" = H$_2$CO(P(Ph)$_3$)$_3$Ru

The voltage stabilizing agent 1 was synthesized according to scheme 1. To a 1 L three-necked round-bottomed flask was added toluene (130 g) and tetralone (111 g). The reaction was heated to 90° C., then the ruthenium catalyst of Scheme 1 (1.08 g) was added. Methoxysilane (about 4 mL) was added and allowed to react for about 2 minutes. The remaining silane (100 g total) was then poured into the reaction flask under a blanket of nitrogen gas. The reaction was refluxed for about 5 days under N$_2$. Additional Ru catalyst (3.8 g) was added and the reaction continued to reflux for about 5 days. The crude product was distilled to obtain pure VSA 1.

VSA 1 (12.89 g) was blended into a silicone polymer (32 g) (Medical Adhesive Type A RTV ["room temperature vulcanization"], Dow Corning Product No. Q4750), along with heptane (27.8 g) and a tin condensation catalyst, dibutyl tin dilaurate (5 drops). This silicone polymer (Med. Adhesive Type A) possesses reactive end groups that react with the VSA. The reaction mixture was cast as a release layer onto PTFE and allowed to cure for two days at room temperature (~25°) to yield an electrically insulating layer wherein the VSA was pendantly attached to the crosslinked silicone polymer. A load of about 10% (by weight) VSA to polymer was achieved. Control films were produced by blending the silicone polymer (32.9 g) with heptane (33.9 g) tin catalyst (5 drops) and dimethoxydimethylsilane (6.9 g). Controls were cast using the same conditions. Cured films were tested for dielectric strength via ASTM D149. The dielectric breakdown strength via ASTM D149 was 20.0 kV/mm for the control film, and 24.7 kV/mm for the VSA-containing film.

Example II

Synthesis of a Copolymer from a Voltage Stabilizing Monomer

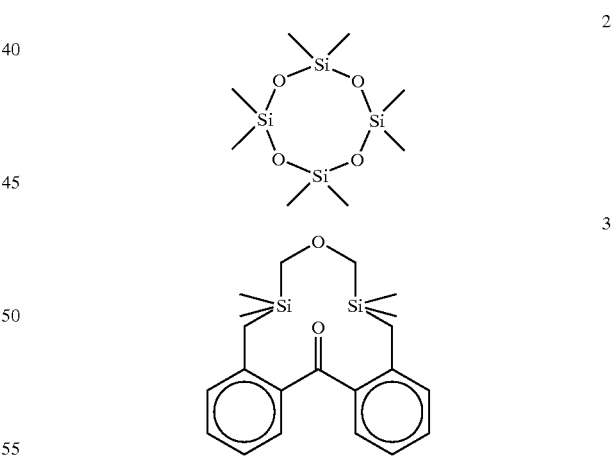

Synthesis of the Voltage Stabilizing Monomer.

The voltage stabilizing monomer 3 was synthesized substantially according to the 16× procedure as described in Londergan (*Polymer Preprints*, 39(1) 272 1998). Toluene (500 mL) and dihydridocarbony(bis) (triphenyl phosphine) ruthenium (4.0 g) were added to a 4-necked round-bottomed flask along with a PTFE-coated magnetic stir bar. The reactants were heated to 135° C. then styrene (0.45 g) was added by syringe and allowed to mix for about 5 minutes in order to activate the ruthenium catalyst. Benzophenone (259 g) in 1 L of toluene was added. Then 1,3-divinyl tetramethyldisiloxane (265 g) in 1 L of toluene was added. Finally, another 200 mL of toluene was added for a solvent total of 3200 mL. The crude product was dissolved into 300 mL of hexanes. To this was added Amberlite IRC-718 ion exchange resin (150 g) in order to bind the Ru metal. Crystals formed and were isolated and washed with methanol. Ethanol was used for recrystallization of the product.

Copolymer Synthesis.

Monomers octamethylcyclotetrasiloxane 2 (1.57 g) (Gelest, Inc.) and the voltage stabilizing agent 3 (5.01 g) and methanesulfonic acid (13.2 μL) (Aldrich Chemical Company) were added to a flame-dried round bottom flask along with a PTFE-coated magnetic stir bar. The flask was capped, purged with nitrogen, and placed in a heated sand bath at 120° C. for 4 days. This cationic ring-opening polymerization yielded the copolymer 4 ($M_w$=123,500 g/mol, $M_n$=59,000 g/mol) wherein the VSA was covalently linked. Copolymer 4 was precipitated three times from tetrahydrofuran (THF)/methanol (MeOH). Varying loads ranging from 10% to 100% (by weight) VSA to octamethylcyclotetrasiloxane 2 were achieved.

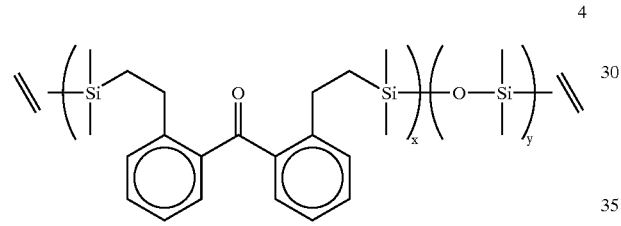

III: $^1$H NMR □: 0.000–0.053 (m, 19.13H), 0.820–0.907 (m, 3.85H), 2.737–2.812 (m, 3.86H), 7.109–7.377 (m, 8H).

Preparation of Samples.

Heptane (about 15 mL) (Aldrich Chemical Company) was used to dissolve copolymer 4 (6.3 g, 50% by weight VSA to octamethylcyclotetrasiloxane) and produce a less viscous solution. 812S silica (0.63 g) was blended in and mixed with a drill press for 3 minutes. Vacuum was pulled on the mixture to eliminate all the bubbles. Tetraethoxy silane (6.4 g) (Gilest Inc.) was added and again mixed with the drill press. Vacuum was again pulled on the mixture to eliminate all the bubbles. The catalyst, dibutyltin diacetate (2 drops) (Gilest, Inc.), was stirred into the mixture. The mixture was cast onto PTFE molds (caps 1.5 inches in diameter) on a level surface and allowed to cure for 10 days at room temperature (~25° C.). A control film was also made, using polydimethylsiloxane (PDMS) in place of copolymer 4.

Due to cracking in transit to the testing facility, the cured films were not tested for dielectric strength.

Example III

Synthesis of a VSA-Containing Dialcohol Suitable for Incorporation into a Polyurethane The voltage stabilizing agents used to stabilize silicone rubbers may also be used to create polyurethanes containing covalently attached voltage-stabilizing agents. One way of doing so is to synthesize a dialcohol which contains one or more pendant, covalently attached functional groups that act as voltage stabilizing agents. This dialcohol can then be used to formulate a polyurethane using standard polyurethane technology.

While the following synthesis uses specific compounds, it should be understood that these specific compounds are used solely to illustrate how one specific dialcohol containing a chemical group that acts a voltage-stabilizing agent may be synthesized. Many chemical variations and synthetic strategies fall within the scope of the principle demonstrated, and will be obvious to one skilled in the art of chemical synthesis, including strategies such as incorporating the voltage-stabilizing agent into the backbone of the polymer, and incorporating voltage-stabilizing agents into isocyanate-containing compounds. In addition, any of the wide variety of methods used to formulate polyurethanes may be substituted for the example formulation described below.

Scheme 2

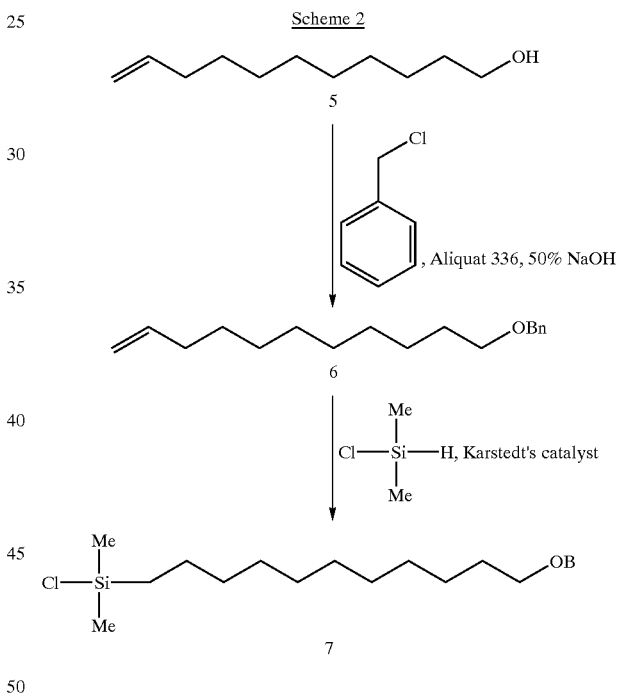

The compound 10-undecen-1-ol (5, scheme 2) (available from Bedoukian Research, Danbury, Conn.) is reacted with benzyl chloride (available from Aldrich Chemical Company, Milwaukee, Wis.), in the presence of the phase transfer catalyst Aliquat 336 (available from Aldrich) and a fifty weight percent aqueous solution of sodium hydroxide (available from Aldrich) to generate the benzyl-protected compound 6. Reacting compound 6 with chlorodimethylsilane (available from Aldrich) in the presence of Karstedt's catalyst (available from United Chemical Technologies, Bristol, Pa.) generates the chlorosilane-terminated benzyl-protected alcohol 7.

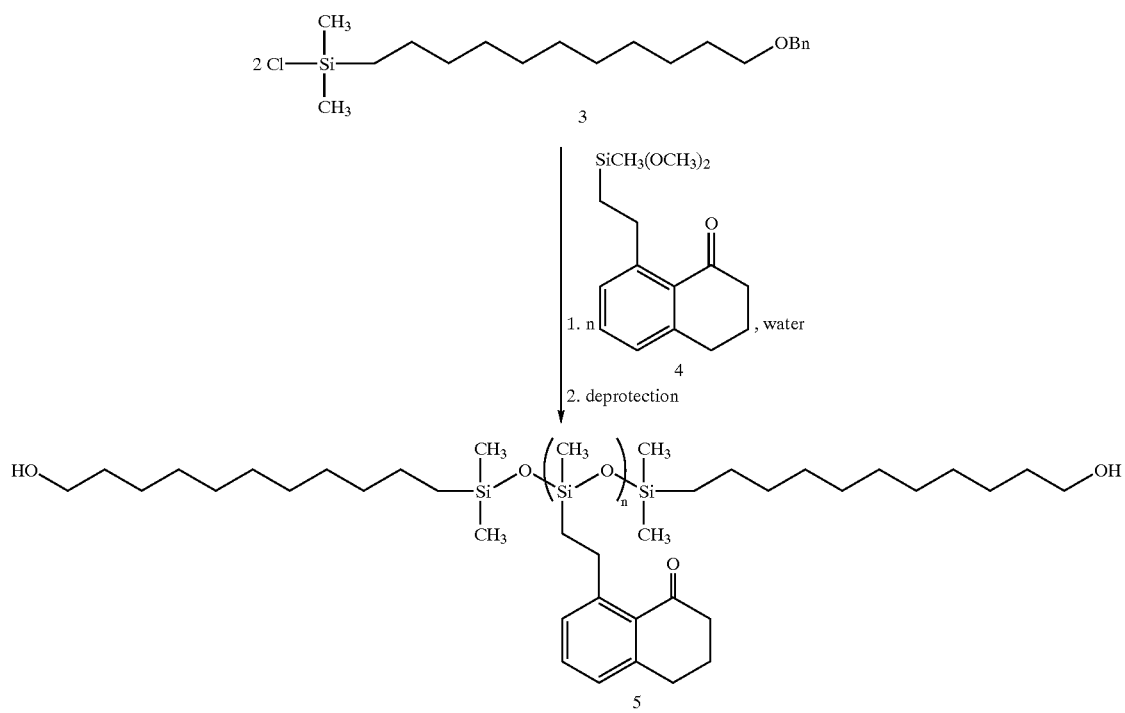

Scheme 3

Two equivalents of compound 7 are then hydrolyzed with n equivalents of the compound 8 to liberate silanols which, upon removal of water, condense to form a protected polymeric diol (scheme 3). The protecting groups may be removed using any of the standard methods available in the literature. One method that is commonly used with good results is hydrogenation under pressure, using palladium on carbon (Aldrich) as catalyst. Upon hydrogenation, the desired dialcohol 9 is obtained.

Dialcohol 9 may be incorporated into a polyurethane by reaction with two equivalents of MDI (4,4'-methylenebis(phenyl isocyanate, Aldrich) using heat and a catalyst such as dibutyltin dilaurate (Aldrich). These reactants form an isocyanate-terminated prepolymer. Upon completion of this prepolymer-forming reaction, one equivalent of 1,4-butanediol (Aldrich) is added to create the desired final polyurethane.

The complete disclosures of all patents, patent applications, publications, and electronically available material cited herein are incorporated by reference. The foregoing detailed description and examples have been provided for clarity of understanding only. No unnecessary limitations are to be understood therefrom. The invention is not limited to the exact details shown and described; many variations will be apparent to one skilled in the art and are intended to be included within the invention defined by the claims.

What is claimed is:

1. An electrically insulating material comprising a polymeric component and at least one linked voltage stabilizing agent, wherein the voltage stabilizing agent is covalently linked to or within the polymeric component.

2. The electrically insulating material of claim 1 wherein the voltage stabilizing agent is covalently incorporated into the backbone of the polymeric component.

3. The electrically insulating material of claim 1 wherein the voltage stabilizing agent is covalently attached pendant to the backbone of the polymeric component.

4. The electrically insulating material of claim 1 further comprising a spacer between the polymeric and the voltage stabilizing agent.

5. The electrically insulating material of claim 1 wherein the polymeric component comprises a polymer selected from the group consisting of a silicone, a polyurethane, a polyolefin, a polyacetal, a polycarbonate, a polyvinyl, a polyamide, a polyimide, a polyacrylic, a polystyrene, a polysulfone, a polyetherketone, a cellulosic, a polyester, a polyether, a fluoropolymer, and copolymers thereof.

6. The electrically insulating material of claim 5 wherein the polymeric component comprises at least one copolymer selected from the group consisting of an olefin-vinyl copolymer, an olefin-allyl copolymer, a polyether copolymer, and a polyamide copolymer.

7. The electrically insulating material of claim 6 wherein the polymeric component comprises a polyether-bis-amide copolymer.

8. The electrically insulating material of claim 5 wherein the polymeric component comprises at least one polymer selected from the group consisting of silicone, a polyurethane, a polyimide and a polyamide.

9. The electrically insulating material of claim 1 wherein the voltage stabilizing agent comprises an electron acceptor group, an electron donor group, and a double bond or a conjugated ring system.

10. The electrically insulating material of claim 1 which is a solid, a gel, a gum, or a fluid.

11. A method for making an electrically insulating material comprising covalently attaching at least one voltage stabilizing agent pendant to a polymeric backbone to yield a polymeric electrically insulating material.

12. An article comprising an electrically insulating material comprising a polymeric component and at least one linked voltage stabilizing agent, wherein the voltage stabilizing agent is covalently linked to or within the polymeric component.

13. The article of claim 12 wherein the electrically insulating material is an integral part of the article.

14. The article of claim 12 wherein the electrically insulating material is a coating.

15. The article of claim 12 wherein the electrically insulating material is a solid, a gel, a gum or a fluid.

16. The article of claim 12 wherein the polymeric component comprises a polymer selected from the group consisting of a silicone, a polyurethane, a polyolefin, a polyacetal, a polycarbonate, a polyvinyl, a polyamide, a polyimide, a polyacrylic, a polystyrene, a polysulfone, a polyetherketone, a cellulosic, a polyester, a polyether, a fluoropolymer, and copolymers thereof.

17. An implantable medical device comprising an electrically insulating material having at least one voltage stabilizing agent and wherein the implanted medical device is selected from the group consisting of an implantable cardioverter/defibrillator (ICD), an implantable medical lead, an implantable pulse generator (IPG), a pacemaker-cardioverter-defibrillator (PCD), an neurostimulator, and nerve stimulator, a muscle stimulator, an implantable monitoring device, an implantable fluid handling device, a defibrillator, an implantable gastric stimulator, an implantable drug pump, and an implantable hemodynamic monitoring device.

18. An implantable medical device comprising an electrically insulating material having comprising a polymeric component and at least one voltage stabilizing agent, wherein the voltage stabilizing agent is covalently linked to or within the polymenc components.

19. The implantable medical device of claim 18 selected from the group consisting of an implantable cardioverter/defibrillator (ICD), an implantable medical lead, an implantable pulse generator (IPG), a pacemaker-cardioverter-defibrillator (PCD), an neurostimulator, and nerve stimulator, a muscle stimulator, an implantable monitoring device, an implantable fluid handling device, a defibrillator, an implantable gastric stimulator, an implantable drug pump, and an implantable hemodynamic monitoring device.

20. A device comprising an electrically insulating material comprising a polymeric component and at least one linked voltage stabilizing agent, wherein the device is selected from the group consisting of a transformer, a capacitor, a high voltage cable, and a lead, and wherein the voltage stabilizing agent is covalently linked to or within the polymeric component.

21. A high voltage cable comprising an electrically insulating material comprising a polymeric component and at least one linked voltage stabilizing agent, wherein the voltage stabilizing agent is covalently linked to or within the polymeric component.

22. A polymer blend comprising a first polymer comprising at least one linked voltage stabilizing agent and a second polymer, wherein the first polymer comprises a polymer selected from the group consisting of a silicone, a polyurethane, a polyolefin, a polyacetal, a polycarbonate, a polyvinyl, a polyamide, a polyimide, a polyacrylic, a polystyrene, a polysulfone, a polyetherketone, a cellulosic, a polyester, a polyether, a fluoropolymer, and copolymers thereof, wherein the polymer blend forms an interpenetrating polymer network.

23. The polymer blend of claim 22 in which the first and second polymers are not crosslinked.

* * * * *

UNITED STATES PATENT AND TRADEMARK OFFICE
CERTIFICATE OF CORRECTION

PATENT NO. : 6,879,861 B2 Page 1 of 1
APPLICATION NO. : 09/745619
DATED : April 12, 2005
INVENTOR(S) : Michael Eric Benz et al.

It is certified that error appears in the above-identified patent and that said Letters Patent is hereby corrected as shown below:

Col. 17, Line 27: ...material having comprising... should read ...material comprising...

Signed and Sealed this

Eleventh Day of December, 2007

JON W. DUDAS
*Director of the United States Patent and Trademark Office*